United States Patent [19]

Röhrle

[11] Patent Number: 4,743,900

[45] Date of Patent: May 10, 1988

[54] DEVICE FOR RELEASING CONTROL SIGNALS FOR A MACHINE TOOL

[75] Inventor: Josef Röhrle, Hessdorf, Fed. Rep. of Germany

[73] Assignee: Siemens Aktiengesellschaft, Berlin and Munich, Fed. Rep. of Germany

[21] Appl. No.: 890,007

[22] Filed: Jul. 24, 1986

[30] Foreign Application Priority Data

Aug. 12, 1985 [DE] Fed. Rep. of Germany ....... 3528922

[51] Int. Cl.⁴ ............................................. G08C 19/16
[52] U.S. Cl. ................................ 340/870.01; 318/562; 364/474
[58] Field of Search ................... 340/870.01; 364/474; 318/562

[56] References Cited

U.S. PATENT DOCUMENTS

| | | | |
|---|---|---|---|
| 3,974,432 | 8/1976 | Thompson | 318/562 |
| 4,142,246 | 2/1979 | Fumihiko et al. | 364/900 |
| 4,277,779 | 7/1981 | Rohrbacher | 340/870.01 |
| 4,642,754 | 2/1987 | Kishi et al. | 364/474 |

Primary Examiner—John W. Caldwell, Sr.
Assistant Examiner—Tyrone Queen
Attorney, Agent, or Firm—Kenyon & Kenyon

[57] ABSTRACT

An electronic cam switching mechanism is used instead of a mechanical cam switching mechanism of a stamping machine or press. The former comprises a write-/read memory which conducts track-wise characterizing signals ("0," "1," and "01," "10," "00"), address-controlled by a travel distance measuring device to subsequent devices, by means of which the control signals corresponding to the binary positions of the mechanical cams are formed.

8 Claims, 2 Drawing Sheets

DEVICE FOR RELEASING CONTROL SIGNALS FOR A MACHINE TOOL

BACKGROUND OF THE INVENTION

The present invention relates to a device for releasing control signals related to the track-wise releasing of binary states as a function of a travel distance signal of a travel distance measuring device, wherein the functional relationship between the travel distance signal and every track of control signals is preset by a control mechanism.

The control signals for pressing and stamping are still being controlled predominantly by mechanical means. For this purpose, mechanical cam control mechanisms are used which are driven, for instance, via the flywheel of the press or the stamping machine. For every tool change, the cams must be adjusted anew, which causes considerable additional resetting time.

Devices of the type mentioned above are therefore already in general use, in which the mechanical cam control mechanism is replaced by an electronic cam control mechanism. In this connection, the cam signals are generated as control signals in dependence on the angular position of the fly-wheel or also on the position of a hydraulic plunger. For this purpose, the fly-wheel is coupled to an angle coder, usually an absolute setting device. The angular position is determined, and the control signals are formed by a microprocessor as a function of the travel distance signals. To this end, the processor compares the current angle positions with stored values and triggers the corresponding control signal if these values agree. Since the processor, in case of a multiplicity of tracks such as corresponds to the number of cams of a mechanical control mechanism, must process these tracks, and the clock frequency of the processor is limited, the result is that the resolution, i.e., the number of steps versus the distance, for instance, one revolution of the fly-wheel, is limited with increasing speed to such an extent that this is not sufficient for a number of applications.

SUMMARY OF THE INVENTION

It is an object of the present invention to provide a device of the type mentioned above such that high travel-distance resolution is possible also at high processing speed and with a multiplicity of tracks.

The above and other objects of the present invention are achieved by the provisions that addresses corresponding to the travel distance signal can be triggered by the travel distance measuring device; that an electronic write/read memory which can be addressed by these addresses for reading out corresponding data is provided, where a sequence of three possible characterizing signals is provided for each track of data in the write/read memory, of which the first indicates the beginning of one state, the second the beginning of another state and the third, the persistence of the one or other state; that the write/read memory is followed by a translator generating the control signals for subsequent processing devices, by which switching from one to the other control signal is performed always from the beginning of the first to the beginning of the second characterizing signal and that, in an initializing phase the respective data can be written into the write/read memory under address control by the control mechanism.

A first advantageous embodiment of the invention is characterized by the feature that the data in the write/read memory can be actualized by the travel distance measuring device through the control mechanism between successive addressing operations of the write/read memory. Such an actualization can be performed easily and fast because only a shift of the first or second characterizing signal has to take place, so that accordingly the action has to be only on a few memory locations of the write/read memory.

In this connection it turns out to be advantageous that a speed-dependent shift of the characterizing signals is provided as the actualization. Such a shift is used particularly in pressing and stamping operations for changing the braking angle for the upper dead center stop.

A further advantageous embodiment of the invention is characterized by the feature that data words two bits wide each are provided as the characterizing signals, where the first characterizing signal is designed as a logical "01," the second characterizing signal as a logical "10," and the third characterizing signal as a logical "00"; that the logical signal representing the respectively first digit of the respective data word is fed to the J-input and the respective logic signals representing the second digit of the respective data word can be fed to the K-input of the JK memory member forming the translator, at the output of which the control signals can be taken off. Thereby, a circuit-wise decidedly simple realization of the device according to the invention is possible.

With such a device it is possible to arrange between the write/read memory and the JK memory member, a polarity-reversing circuit which is controlled in dependence on the direction of rotation. Thereby, the control signal can be generated for both directions of rotation by the provision that a second characterizing signal can be formed from the first characterizing signal and a first characterizing signal from the second characterizing signal.

For the case that shifts of the characterizing signals do not have to be performed frequently, it is also possible that in the write/read memory at least one track of data is provided which represents two characterizations, logical "0" and logical "1", whereby one of the binary states can be indicated by one of the characterizations. This reduces the requirement for storage space for such a track of data substantially.

Due to the fact that in the write/read memory at least one track of data is provided which represents two characterizations, logical "0" and logical "1," where one of the binary states can be indicated with the arrival of one of the characterizations for a period of time given by a time delay member, a timing control of the control signals can be realized in a decidedly simple manner.

A reliable travel distance measurement is achieved by the provision that an absolute transmitter is assigned to the travel distance measuring device. After a failure of the travel distance measuring device, the latter would be usable again immediately without synchronization after being put in operation.

BRIEF DESCRIPTION OF THE DRAWINGS

An embodiment of the invention will be explained in greater detail in the following description with reference to the drawings, in which.

DETAILED DESCRIPTION

Figure 1:
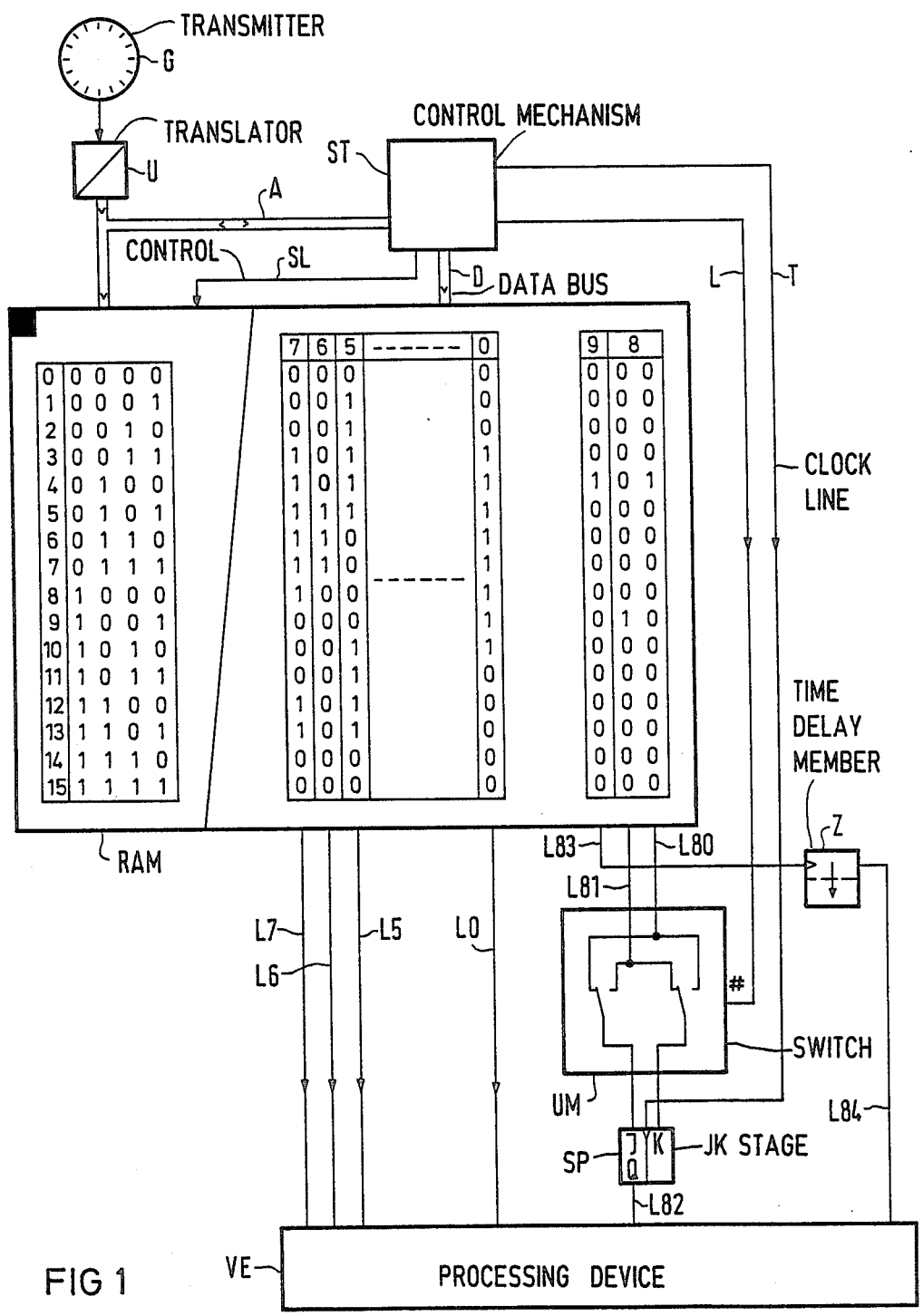
FIG. 1 shows a block diagram according to the invention.

In the presentation according to FIG. 1, an absolute transmitter G for the measurement of travel distance is disposed in a machine tool which is not shown for the sake of clarity and the output signal of which is fed to a translator U. The translator U generates from the transmitter signals, according to the embodiment, sixteen addresses 0 to 15 per revolution in the form of corresponding binary numbers 0000 to 1111, as shown in tabular form in the left part of a write/read memory RAM connected to the translator U. The resolution into sixteen addresses is chosen in the embodiment only for the sake of clarity; with a resolution of 0.1°, as such a value is realistic, 3,600 addresses will have to be provided for each revolution of the transmitter G, whereby an address width of 12 bits would be obtained.

The addresses determined by the translator U are supplied not only to the addressing input of the write/read memory RAM but via an address bus A also to a control mechanism ST. The latter is connected, for one, to the control line SL, and otherwise to a data bus D to the write/read memory RAM. By means of a corresponding control signal on the control line SL, the control mechanism ST can determine whether the write/read memory RAM must be in write or read operation.

As indicated in the write part of the symbol for the write/read memory, RAM characterizing signals are associated in tracks 0 to 9 with the addresses of the write/read memory RAM, where each track would correspond to the cam outline of a mechanical control mechanism. In the tracks 0 to 7, two characterizations, logical "0" and logical "1", are provided in each of the tracks for the purpose to indicate which control signal is to be read out at which address.

The control signals of the tracks 0 to 7 are read out via lines L0 to L7, which lead to a processing device VE. In the presentation according to FIG. 2, the control signals on the lines L0 to L7 are shown in rows 0 to 7 for the addresses 0 to 15. It can be seen that, for the track 0 from the address 0 to inclusively the address 2 a control signal is present which, in a mechanical control mechanism, would correspond to a passive cam, while from the address 3 to the address 10 inclusively, a control signal is in effect which would correspond in a mechanical control mechanism to an active cam and wherein, subsequently thereto, again the first-mentioned control signal is present from the address 11 to the address 15 inclusively. In a similar manner, the control signals in the lines 5, 6 and 7 are obtained for the tracks 5, 6 and 7 of the write/read memory RAM. The tracks 1 to 4 and the corresponding lines L1 to L4 in FIG. 1 and the lines 1 to 4 are not shown for the sake of clarity. The tracks 8 and 9 will be discussed in greater detail in the following.

The characteristics are written into the write/read memory RAM by means of the control mechanism ST by giving to the read/write memory RAM a write command via the control line SL, and also the corresponding characteristics, logical "0" and logical "1", are impressed on the write/read memory RAM after the addressing of the write/read memory RAM triggered by the control mechanism ST via the address bus A and the data bus D. This impression of the characteristics can be accomplished in an initialization phase. Should a change of the stored data take place during operation, this change would be possible only between the individual addressing of the write/read memory RAM taking place by the translator U. Such an actualization, however, would require an actualization of the characterizing signals of two addresses per shift step of the control signal, so that in the case of a shift of the beginning and the end of the control signal by, for instance, three steps, the data content of six addresses must be changed. Such a change, however, requires a relatively long processing time.

The invention comes in inasmuch maximally only the data of two addresses needs to be changed for any shifts of electronically representable cams. For this purpose, always three characterizing signals are associated with each address, as indicated in track 8. These characterizing signals can then be entered into the write/read memory RAM during the initialization phase or between the individual addressings. A characterizing signal logical "01" corresponds here to the beginning of a control signal; a characterizing signal logical "10" corresponds to a change to the other control signal and a characterizing signal logical "00" corresponds to the existence of the one or the other control signal. These characterizing signals are conducted via the lines L80 and L81, respectively, and a double-throw switch UM to the inputs J and K of a JK stage SP which is controlled by a clock pulse edge and the output Q of which is connected via a line L82 to the processing device VE.

Figure 2:
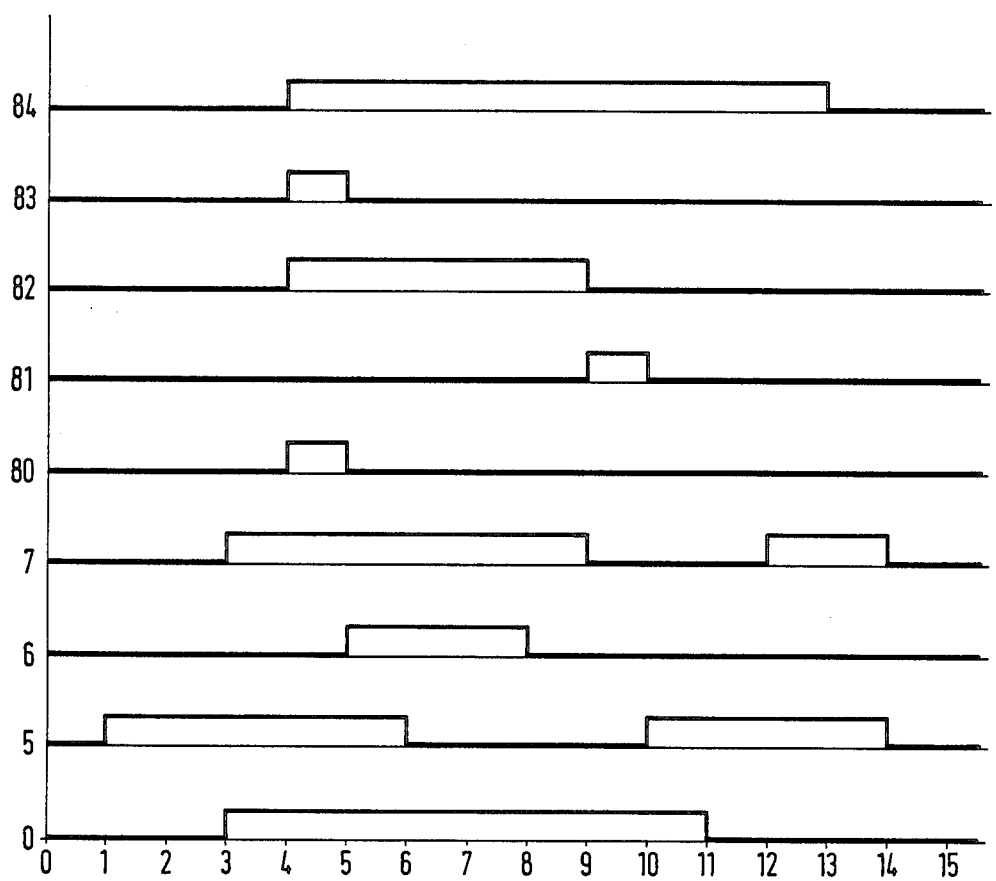
FIG. 2 show timing diagrams for the system of FIG. 1.

In the assumed position of the double-throw switch UM, the characterizing signal logical "01" which is shown on line 80 of FIG. 2, causes the characterizing signal logical "01" the setting of the memory stage SP, which leads to a control signal waveform according to lines 82 of FIG. 2, while the characterizing signal logical "10" causes the resetting of the memory stage SP which manifests itself in a change of the control signal according to line 82 of FIG. 2. The setting and resetting process of the memory member SP is controlled by clock pulse edges in that a control frequency of the control mechanism ST is conducted to the memory stage SP via a clock line T. The frequency of this clock is higher than the highest address change frequency.

Due to the fact that the characterizing signals for the beginning and the end of a control signal differ only by an inversion, it is possible to assure in the case of a reversal of the direction of rotation the continued formation of the control signal by just such an inversion of the characterizing signals. For this purpose, the control mechanism ST determines from the sequence of output signals of the translator U, the direction of rotation of the absolute transmitter G. If a change of the direction of rotation takes place, a corresponding binary signal is conducted via a line L to the polarity-reversing circuit UM which then occupies the prevailing switch position.

The track 9 shows the possibility that a so-called time cam can be realized by means of two characterizations, logical "0" and logical "1", in that the occurrence of logical "1," in the embodiment at the address 4, sets a time delay member Z, whereby the control signal waveform shown on line 84 of FIG. 2 results.

In the foregoing specification, the invention has been described with reference to a specific exemplary embodiment thereof. It will, however, be evident that various modifications and changes may be made thereunto without departing from the broader spirit and scope of the invention as set forth in the appended claims. The specification and drawings are, accordingly, to be regarded in an illustrative rather than a restrictive sense.

What is claimed is:

1. A device for track-wise releasing of control signals associated with binary states in dependence on a travel distance signal of a travel distance measuring device of a machine tool, where a functional relationship between the travel distance signal and each track of control signals can be predetermined by a control mechanism, addresses corresponding to the travel distance signal being released by the travel distance measuring device, an electronic write/read memory being provided coupled to the measuring device which can be addressed by these addresses for releasing respectively associated data, said data including the control signals to be supplied to a processing device, there being provided in the write/read memory, for each track of data, a sequence of three possible characterizing signals, a first of which indicates a beginning of one state, a second of which indicates a beginning of another state, and a third of which indicates a continued presence of the one or the other state, the write/read memory being coupled to translator means which can be addressed by the characterizing signals, said translator means operating so as to control switching between control signals whereby from the beginning of the first of the characterizing signals to the beginning of the second of the characterizing signals, switching between control signals is performed, and further comprising initializing means in said control mechanism for writing respective data into the write/read memory under address control.

2. The device recited in claim 1, wherein the data can be written into the write/read memory by the control mechanism between successive addressings of the write/read memory by the travel distance measuring device.

3. The device recited in claim 2, further comprising means for performing a speed-dependent shift of the characterizing signals when writing said characterizing signals into the write/read memory.

4. The device recited in claim 2 wherein, as characterizing signals, data words two bits wide are provided where the first characterizing signal is realized as a logical "01," the second characterizing signal as a logical "10," and the third characterizing signal as a logical "00," the logical signal representing the respectively first digit of the respective data word being fed to a J-input and the logical signal representing the second digit of the respective data word being fed to a K-input of a JK storage member forming the translator means, at an output of which the control signals are supplied.

5. The device recited in claim 4, further comprising a double-throw switch controlled dependent on the travel direction arranged between the write/read memory and the JK-storage member.

6. The device recited in claim 1, wherein in the write/read memory at least one track of data is provided which represents two characteristics, logical "0" and logical "1," whereby one of the binary states can be indicated by one of the characterizations.

7. The device recited in claim 1, wherein in the write/read memory, at least one track of data is provided which represents two characteristics, logical "0" and logical "1" whereby, with the arrival of one of the characterizations, one of the binary states can be indicated for a time period preset by a time delay means.

8. The device recited in claim 1, wherein the travel distance measuring device comprises an absolute transmitter.

* * * * *